United States Patent [19]

Crean

[11] Patent Number: 4,728,144

[45] Date of Patent: Mar. 1, 1988

[54] TRAILER CONSTRUCTION

[75] Inventor: John C. Crean, Corona del Mar, Calif.

[73] Assignee: Fleetwood Enterprises, Inc., Riverside, Calif.

[21] Appl. No.: 921,369

[22] Filed: Oct. 20, 1986

[51] Int. Cl.⁴ .................. E03D 13/00; B60P 3/32
[52] U.S. Cl. .................. 296/168; 296/156; 296/37.14; 4/321
[58] Field of Search .............. 296/37.1, 37.2, 37.6, 296/37.14, 37.16, 156, 164, 168, 24 R; 280/5 R, 5 A, 5 D, 7; 4/321, 378

[56] References Cited

U.S. PATENT DOCUMENTS

| | | | |
|---|---|---|---|
| 2,743,955 | 5/1956 | Willson | 296/156 |
| 2,817,091 | 12/1957 | Painter | 4/321 X |
| 3,165,350 | 1/1965 | Willson | 296/156 |
| 3,254,914 | 6/1966 | Steck | 296/181 |
| 3,287,058 | 11/1966 | Wells | 296/37.14 |
| 3,565,480 | 2/1971 | McCollum et al. | 296/168 |
| 3,633,219 | 1/1972 | Byrd | 4/321 X |
| 4,652,041 | 3/1987 | Barber et al. | 296/168 X |
| 4,653,125 | 3/1987 | Porter | 4/321 X |

FOREIGN PATENT DOCUMENTS

| | | | |
|---|---|---|---|
| 1346115 | 1/1963 | France | 296/168 |
| 2375070 | 8/1978 | France | 296/156 |

Primary Examiner—Robert B. Reeves
Assistant Examiner—Russell D. Stormer
Attorney, Agent, or Firm—Edward D. O'Brian

[57] ABSTRACT

A desirable travel trailer can be constructed so that the internal floor within such a trailer is capped by a series of joists located on the chassis of the trailer. The spaces between the joists can be used to hold various tanks and other items assocated with the use of the trailer. Preferably the tanks which are expected to be heaviest as the trailer is used are located directly above the undercarriage of the trailer so that the tongue weight of the trailer is not altered or significantly altered as the weight of such tanks are changed due to changes in their contents.

8 Claims, 6 Drawing Figures

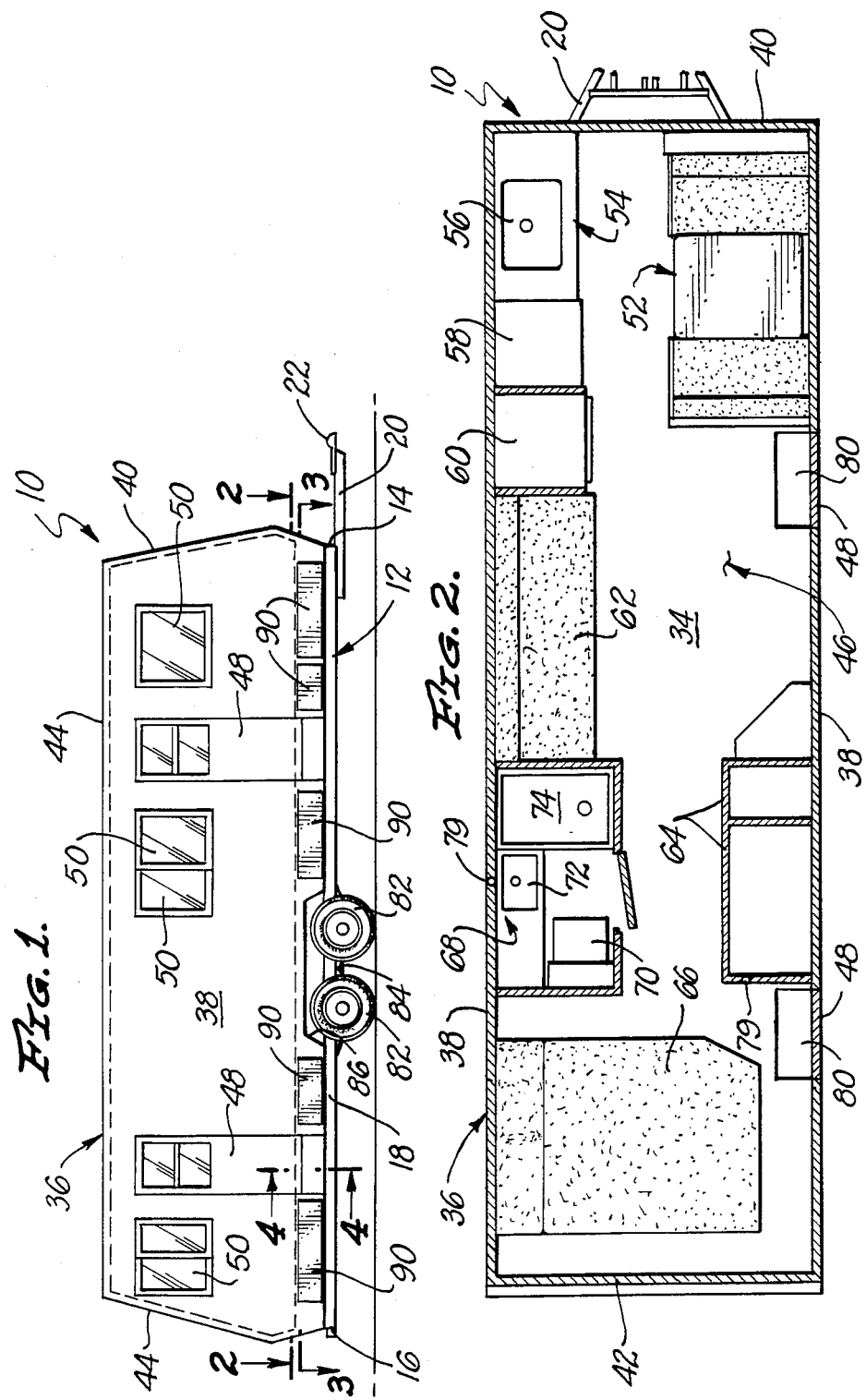

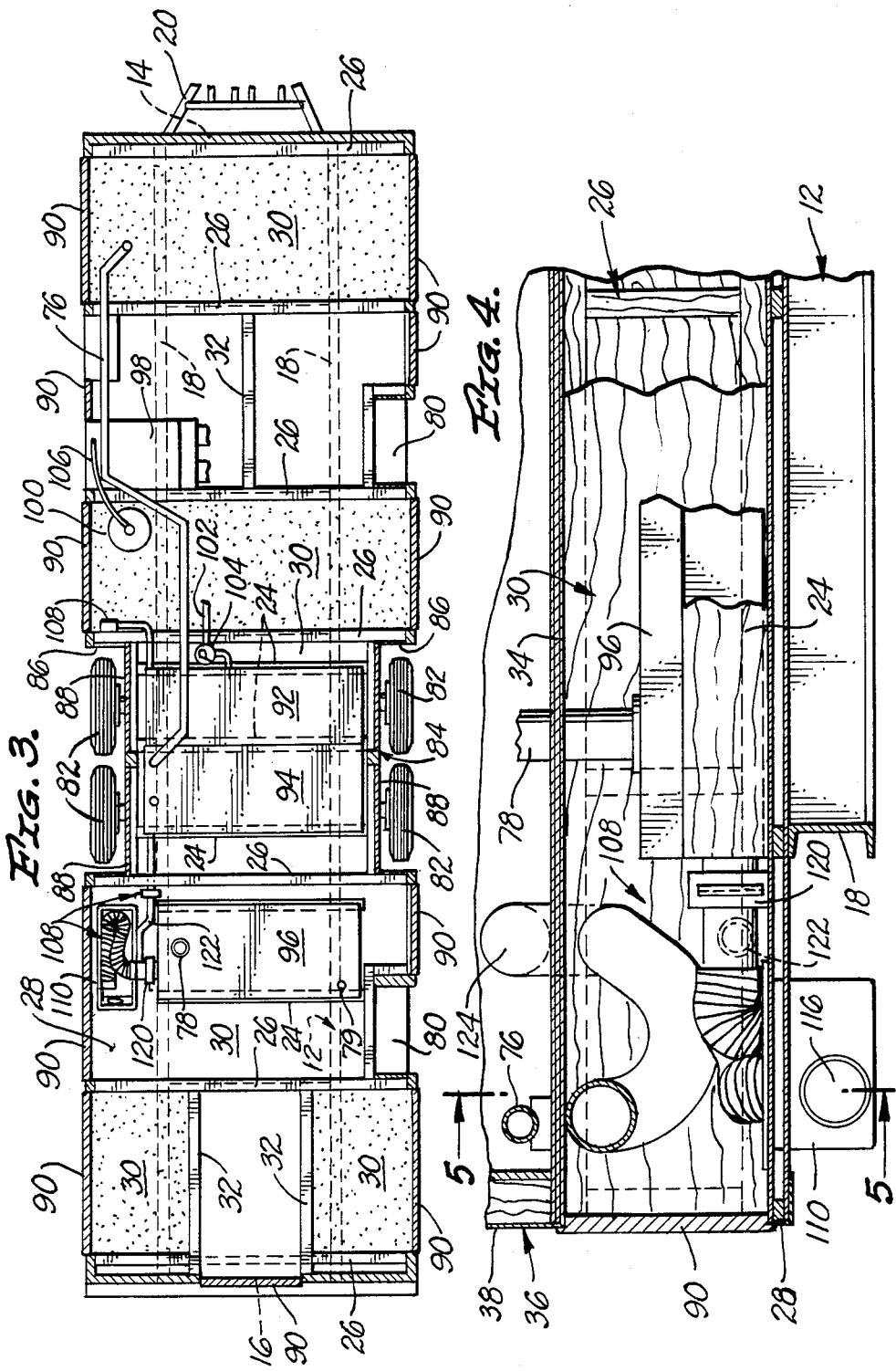

TRAILER CONSTRUCTION

BACKGROUND OF THE INVENTION

The invention set forth in this specification pertains to a new and improved trailer construction. More specifically it pertains to a new and improved manner of constructing travel trailers.

Since the term "trailer" can be used in differing ways it is considered desirable to indicate that this word is employed in this specification to designate any wheeled vehicle which has wheels located between its ends in such a manner that the vehicle is adapted to be towed behind a powered vehicle such as a car or a truck. Such trailers can be differentiated from various other related vehicles which are commonly referred to using terms as "cars", "carriages" and the like in that they do not employ wheels at their ends in such a amnner that they are inherently stabilized against tipping by such wheels. As the term "trailer" is used herein it designates structures which usually or normally require stabilization from a member or part not an inherent part of the trailer. Most commonly this is achieved when a trailer is used through the use of a "hitch" employed to attach the trailer to a towing vehicle. When such a trailer is stored normally an appropriate stand or support is used to prevent it from tipping.

The manner in which a trailer is constructed and loaded is important in controlling the load placed by a trailer on such a hitch. The latter is frequently referred to as the "tongue weight" since the usual trailer hitch is construction so as to use a so called "tongue" to attach the trailer to the towing vehicle. This tongue weight is quite important to the towing of any trailer. This is most easily illustrated by referring to trailers of the type with which the present invention has its preferred utility-so-called "travel trailers". This latter term is employed in this specification to designate trailers which are especially constructed so as to be useful as either temporary or, on occasion, as permanent or semipermanent human housing.

To be significantly useful for such purposes a travel trailer normally has to be constructed so as to accommodate various "components" such as a refrigerator, a heater, various tanks for holding consumable water and normally both so called "gray" and "solid" liquid wastes and others. These items, and in particular such tanks and their contents, are important in connection with the weight of a trailer. If they are located either ahead or behind of the wheels of a trailer they will influence the "balance" of the trailer.

If the weight between the wheels and the tongue of the trailer is comparatively great the load placed by the trailer may be in excess of the capacity of a particular towing vehicle to support the load and will normally tend to detrimentally affect the manner in which the trailer follows or "trails" the towing vehicle as the trailer is pulled. On the other hand if the weight of the trailer is concentrated to the rear of the wheels of the trailer there many be problems involving the connection of the trailer to the towing vehicle and normally the towing characteristics of the trailer will be detrimentally affected.

As a consequence of these factors the manner in which a travel trailer is constructed has been quite important in connection with the utility of such a trailer. To achieve desirable towing characteristics in such a trailer it has been necessary to locate relatively heavy components of or within the trailer so as to achieve a desired tongue weight such that the trailer can be towed without placing an excessive load on the towing vehicle.

As a consequence of this the internal "lay-out" of a travel trailer has had to be limited in such a manner as to achieve a desired or intended weight balance. This has restricted the manner in which the interiors of travel trailers have been designed. The interior design of travel trailers has also been somewhat restricted as a consequence of the need to accommodate in the floor area of such a trailer enclosures around the wheels of the trailer. The latter are on occasion referred to as "wheel wells".

Both of such limitations as to the internal layouts within a travel trailer are important from a utilitarian and from a purely commercial standpoint. It is believed that travel trailer designers will be able to improve the utility of the manners in which the interiors of travel trailers are laid out if they do not have to be significantly concerned with the weight balance of such trailers. It is also considered that a corresponding type of improvement can be achieved by constructing such trailers so that conventional wheel wells are no longer present within the interiors of such trailers.

BRIEF SUMMARY OF THE INVENTION

Broadly the present invention is intended to provide new and improved trailers. More specifically it is intended to provide new and improved travel trailers which are of constructed in such a manner that the interior floors of such trailers are unencumbered by wheel wells and in such a manner that the interiors of such trailers do not have to be layed out in a conventional manner as to achieve a desired weight balance necessary for satisfactory trailer operation. These factors are considered to be important from a commercial standpoint.

The noted advantages are achieved by providing a trailer including an elongated chassis having front and rear ends and sides, means for towing the trailer attached to the front end of said chassis so as to extend therefrom, undercarriage means including wheels attached to said chassis between the ends thereof, said undercarriage means including wheels for supporting said trailer extending beneath said chassis and a trailer body having an internal floor mounted on said chassis so as to extend upwardly therefrom, said body extending from the front to the rear of said chassis and having sides corresponding to the sides of said chassis in which the improvement comprises:

a series of spaced, parallel joist means mounted on said chassis, said floor being supported by said joist means and being spaced from said chassis by said joist means, said floor being continuous and flat between the sides and ends of said body, all of said joist means extending transverse to the length of said chassis, all of said joist means except those adjacent to said undercarriage means extending between the sides of said body, said undercarriage means being constructed so that said wheels extend generally upwardly from said chassis means adjacent to the sides of said body, those of said joist means adjacent to said undercarriage means terminating within the sides of said body so as to provide spaces located generally above said undercarriage means for said wheels at the sides of said body, and tank means for holding fluids associated with the use of said trailer located between those joist means generally above said undercarriage means.

It will be apparent from the remainder of this specification that there is more to a preferred structure in accordance with this invention than this summary would indicate and that other advantages are achieved with the invention than have been specifically discussed in this section of this specification. Thus, as will subsequently pointed out various functional components of a travel trailer can be located beneath the trailer floor gently between various of the stud means used and the spaces between certain of these stud means can be employed for storage or other purposes. All of such items are considered to make a travel trailer of the invention more advantages or desirable than prior related trailers.

BRIEF DESCRIPTION OF THE DRAWINGS

Because of the nature of this invention it is best more fully described with reference to the accompanying drawings in which:

FIG. 1 is a side elevational view of a presently preferred embodiment or form of a travel trailer in accordance with this invention;

FIG. 2 is a diagrammatic cross-sectional view at an enlarged scale taken at line 2—2 of FIG. 1;

FIG. 3 is a diagrammatic cross-sectional view at the same enlarged scale taken at line 3—3 of FIG. 1;

FIG. 4 is a partial cross-sectional view at a different enlarged scale taken at line 4—4 of FIG. 1;

Figure 5:
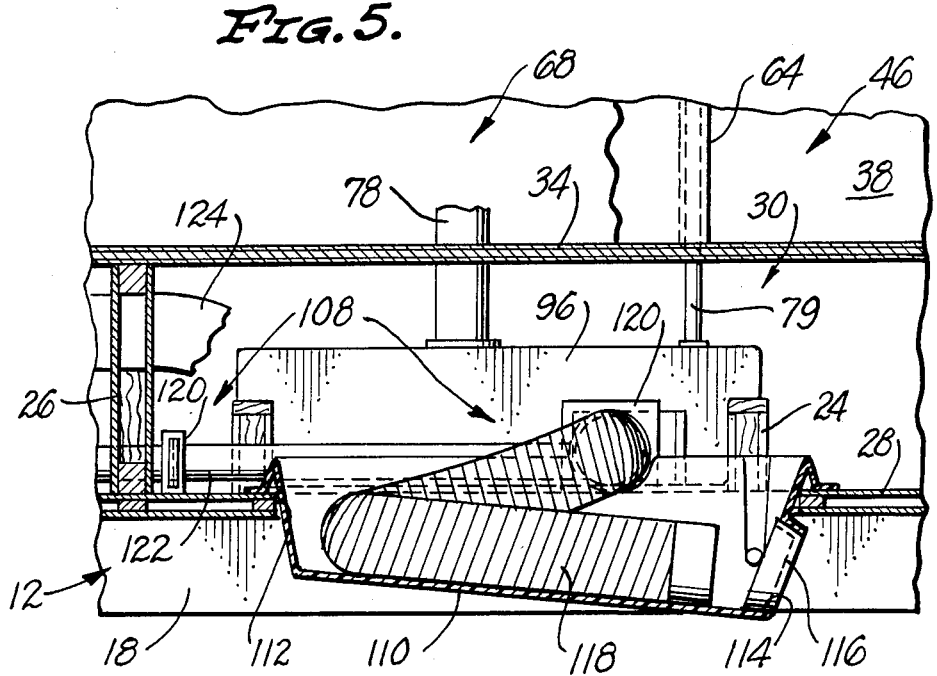
FIG. 5 is a partial cross-sectional view taken at line 5—5 of FIG. 4.

It is noted that the accompanying drawings are intended to be used in connection with an explanation of this invention. The trailers shown in them are constructed so as to utilize the principles or concepts of the invention as are set forth in the accompanying claims. Because of the nature of the invention these concepts or principles can be used in trailers which are somewhat different than those illustrated and described herein through the exercise of routine mechanical engineering skill.

DETAILED DESCRIPTION OF THE PREFERRED EMBODIMENTS

In the drawings there is shown a travel trailer 10 in accordance with this invention which is constructed so as to include an elongated chassis 12 having a front end 14, a rear end 16 and two parallel sides 18. This chassis 12 is of a conventional type such as in commonly used in constructing travel trailers. Because of the conventional character of the chassis 12 many details of it are not shown in the drawing or described in this specification. A conventional tongue 20 is secured to the front end 14 of the chassis 12 for the purpose of attaching the trailer 10 to a vehicle (not shown) used to tow it through the use of a conventional hitch member 22.

The chassis 12 supports a series of joists 24 and 26 which are located as shown to extend perpendicularly to the length of the chassis 12. These particular joists 24 and 26 can simply be boards of the type commonly used as joists in building construction. Preferably, however, they are composite structures each of which is more or less in the nature of a beam which from a functional standpoint is the equivalent of such a board but which is lighter in weight than such a board. Normally such a composite beam will be more desirable than such a board because of its strength characteristics.

These joists 24 and 26 are all located so as to spaced from one another and so as to be parallel to one another; they are normally secured in place to the chassis 12 in a known, obvious manner through the use of conventional fasteners (not shown). It is considered desirable to provide a sub-floor 28 beneath these joists 24 and 26 and the chassis 12 so as to prevent road dust or other accumulations from settling within the spaces 30 between these joists 24 and 26 so that these spaces 30 may be effectively used for storage and other purposes as subsequently indicated. If desired cross joists 32 may be provided for structural purposes between some of the adjacent joists 26 in spaces 30 which are to be used in such a way that these presence of these cross joists 32 will not be undesirable.

The joists 24, 26 and 32 are used to support not only a flat, unobstructed floor 34 of the trailer 10 but in addition to support and hold a trailer body 36. It is noted that this floor 34 does not contain the usual wheel wells commonly found in travel trailers. This trailer body 36 has sides 38, a front 40, a rear 42, and a top 44 which cooperate together so as to define the interior 46 of the trailer 10. The sides 38, the front 40 and the rear 40 are secured to the joists 24, 26 and 32 in a conventional manner. The floor 34 extends so as to completely cover the joists 24, 26 and 32 between the sides 38. Thus, this floor 34 extends beyond the sides 18 of the chassis 12 and beyond the ends (not separately numbered) of the joists 24 and 26. One or more conventional doors 48 are located in one of the sides 38. Various windows 50 are spaced as desired in the sides 38, the front 40 and the rear 42.

Various items such as a known table unit 52, a food preparation unit 54 including a sink 56, a cooking unit 58, a refrigerator 60, a sofa bed 62, closets 64, a bed 66 and a small toilet 68 including a water closet or similar fixture 70, a wash basin 72 and a shower 74 are located within the interior 46. The sink 56, shower 74 and the basin 72 are connected to conventional drain lines 76. A similar sewer line 78 extends from the fixture 70. Conventional vents 79 for these lines 76 can be accomodated in any convenient manner. It is considered important to note that these various items as are enumerated in the preceeding paragraph can be located wherever desired on the floor 34. As a consequence of this a designer can have a great deal of latitude in laying out the interior 46 of a trailer 10 in accordance with this invention. This is attributable to the absence of wheel wells of the like as are present in conventional travel trailers.

Currently it is considered preferable to include within the floor 34 of small recessed steps 80 adjacent to the doors 48. The latter can, of course, be located wherever desired in the sides 38 so long as they are not immediately adjacent to wheels 82 forming a part of a conventional undercarriage 84. This undercarriage 84 is located beneath the chassis 12 so that the wheels 82 can support the entire trailer 10 as it is used. It is normally attached to the chassis 12 in a conventional manner. Because of this the undercarriage 84 is not described in detail in this specification.

It is noted that the wheels 82 are located generally adjacent to the joist 24 beneath the floor 34 in what can be regarded as side cavities 86 roughly corresponding to conventional trailer wheel wells (not shown). Doors or similar closures 88 are located in the cavities 86 so as to close off the spaces 30 between the joist 24 and the adjacent joists 26. Corresponding doors or closures 90 are located in the sides 38 beneath the floor 34 so as to close off the other spaces 30 beneath this floor 34.

In the trailer 10 an elongated, generally flat tank 92 which is adapted to hold consumable water is lcoated in a space 30 next to the joist 24 and on the side (not separately numbered) of the joist 24 toward the front end 14. This tank 92 extends across the central part of the chassis 12. A similar tank 94 which is adapted to hold liquid wastes or "grey waste" from the sink 56, the basin 72 and the shower 74 is centrally located within the other space 30 at a side (not separately numbered) of the joist 24. With this construction these two tanks 92 and 94 are located directly or almost directly above the undercarriage 84. This is considered important. As a consequence of the placement of the tanks 92 and 94, changes in the weight of these two tanks 92 and 94 and their contents will not normally be significant in changing the weight at the tongue 20 applied to a towing vehicle (not shown).

Further, as a consequence of this, changes in the contents (or lack thereof) of these two tanks 92 and 94 will not significantly alter the weight distribution of the trailer 10 in such a manner as to change its towing characteristics. These two tanks 92 and 94 are located in the positions shown since it is considered that normally the weight of their contents will change to a greater extent than the weight of the contents of other tanks as subsequently described used in the trailer 10.

The principal of such other tanks is a tank 96 which is adapted to contain "solid" wastes from the toilet 68. At times the content of a tank such as the tank 96 is referred to as "black water." This tank 96 is located within a space 30 as shown which is remote from another space 30 containing a conventional heating unit 98 located on the oposite side of the undercarriage 84 so as to substantially or approximately counterbalance the weight of the this heating unit 98. A tank 100 adapted to contain compressed fuel gas may also be located in a space 30 which does not contain any other tank. The remaining unoccupied spaces 30 can, of course, be used for storage purposes.

In the described construction the drain lines 76 extend through holes (not separately identified) in floor 34 and in the various joists 24 and 26 across various spaces 30 from the sink 56, the shower 74 and the basin 72 to the tank 94. Another branched line 102 containing a conventional pump 104 extends from the tank 92 and is used to connect this tank 92 to the sink 56, the shower 74 and the basin 72. The sewer line 78 is used in a similar manner to connect the toilet fixture 70 to the tank 96. A fuel line 106 is used in a corresponding manner to connect the tank 100 to the cooking unit 58 and to the heating unit 98.

Because of the positions of the tanks 92, 94 and 100 within the spaces 30 it is possible to dispense with the usual exterior mounting of the conventional inlet and outlet structures 108 normally used in filling and emptying these tanks. This is because it is possible to gain access to these structures 108 through various doors 88 and 90. This is considered to be beneficial in providing a "clean" exterior appearance of the trailer 10. However, it is noted that it is possible to provide the inlet structure 108 for the tank 92 in a space 30 next to the space 30 in which this tank 92 is located and the outlet structure 108 for the tank 94 in the space 30 next to the space 30 within which this tank 94 is located.

This is considered desirable since the particular doors 88 to the spaces 30 within which these tanks 92 and 94 are located are in such a position that it will normally be necesary to remove the wheels 82 in order to gain access to these two tanks 92 and 94, as opposed to this the other spaces 30 are all easily accessible through the doors 90. This type of "internal" mounting of these structures 108 is considered to be particularly important in protecting the structures 108 against damage which might occur if they were exposed to the exterior of the trailer 10 under normal circumstances.

This is considered to be particularly important in connection with the outlet structure 108 used to drain the tank 96. Preferably this particular outlet structure 108 includes a solid, corrosion-resistant plastic pan 110 set within a hole 112 in the subfloor 28 adjacent to the tank 96. This pan 110 contains a rearwardly facing drain opening 114 which is normally closed by a plug 116. A drain hose 118 forming a part of the outlet structure 108 for the tank 96 normally extends in a somewhat coiled manner into the interior of this pan 110. When the tank 96 needs to be emptied the plug 116 can be removed and the hose can be extended through the opening 114 to an appropriate receptacle (not shown). Then a conventional valve 120 can be opened until the tank 96 is substantially empty.

A similar valve 120 is preferably located in a drain line 122 leading from the tank 94 through a joist 26 to the hose 118. As a consequence of this when the hose 118 is extended through the opening 114 it can be used to convey the contents of either the tank 96 or the tank 94 away from the trailer 10. Because this hose 118 and the outlet structures 108 and associated items are within an enclosed space 30 except when the hose 118 is extended as described these "parts" are protected against damage and accumulations. This is considered to be important.

It is noted that the line 122 extends through a joist 26. With the construction of the trailer 10 various lines, electrical cables (not shown) and the like may be located so as to extend between adjacent spaces 30 or they may be located so as to extend upwardly through the floor 34 in any manner which is most convenient to the interior layout employed. This is to a degree illustrated by a hose 124 extending from the heater 98. Further, whenever the locations of various items within the interior of the trailer 10 permit, a line can be located so as to extend under such interior items within the trailer 10. This is illustrated by the line 76 which, as shown extends largely above the floor 34.

Figure 6:
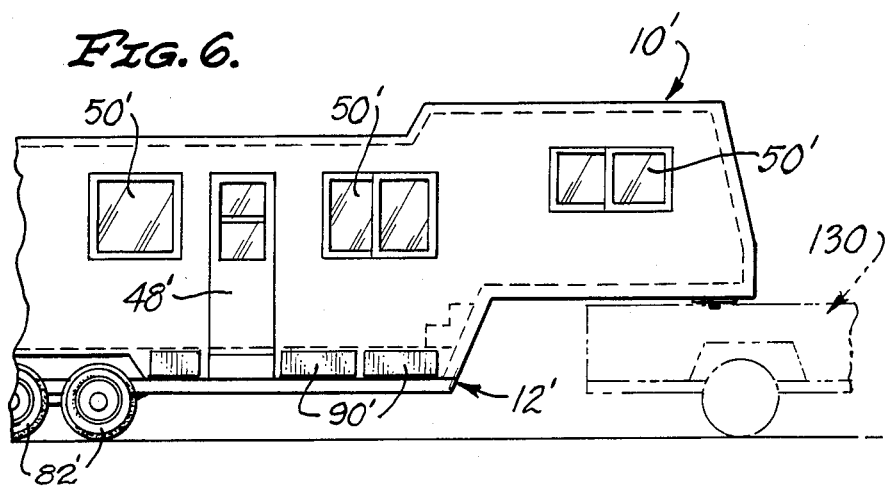
FIG. 6 is a partial elevational view corresponding to FIG. 1 but showing a modified form of a travel trailer of this invention-a so called "fifth wheel" type trailer.

In FIG. 6 of the drawings there is shown a trailer 10' in accordance with this invention of the so-called "fifth wheel" type which is adapted to be towed by a pick-up 130 in a conventional manner. Since all parts of the trailer 10' are either the same as or directly correspond to parts of the trailer 10 the construction of this trailer 10' is not described in detail in this specification. Such parts are designated by the primes of the numerals previously used to designate such parts and are not separately decsribed in this document.

The trailer 10" differs from the trailer 10 in that the body 36' is extended so as to overlay the pick-up 130. In this trailer 10' the tongue 20' extends downwardly from the body 36' so that it will be supported by the pick-up 130 in a conventional manner. In accordance with the invention no effort is made to use the features of the invention in that portion (not separately) numbered of the body 36' which extends generally above the pickup 130.

In designing trailers which utilize the concepts of the invention but which are somewhat different than the specific trailer 10 described herein it is considered important to always use the space between the floor and the subfloor of the trailer generally above the undercarriage of the trailer to contain one or more tanks which are expected to contain varying quantities of liquid as the trailer is used. As a result of this any variation in the width of or within such tanks will normally not make any significant difference in the towing characters of the trailer or in the weight applied by the trailer to the towing vehicle.

This important advantage is achieved concurrently with various other benefits. As an example of this a construction in accordance with the invention provides significant storage beyond than which will normally be provided within a conventional trailer of comparable length. Further, all of the items indicated located beneath the floor of the trailer will be protected by virtue of the fact that they are enclosed. Perhaps it is more important that the elimination wheel wells extending into the interior space within a trailer makes it possible use such interior space more effectively than it has been used in prior related trailers.

I claim:

1. A trailer including an elongated chassis having front and rear ends and sides. means for towing the trailer attached to the front end of said chassis so as to extend therefrom, undercarriage means including wheels attached to said chassis between the ends thereof, said undercarriage means including wheels for supporting said trailer extending beneath said chassis and a trailer body having an internal floor mounted on said chassis so as to extend upwardly therefrom, said body extending from the front to the rear of said chassis and having sides corresponding to the sides of said chassis in which the improvement comprises:
   a series of spaced, parallel joist means mounted on said chassis, said floor being supported by said joist means and being spaced from said chassis by said joist means, said floor being continuous and flat between the sides and ends of said body,
   all of said joist means extending transverse to the length of said chassis,
   all of said joist means except those adjacent to said undercarriage means extending between the sides of said body,
   said undercarriage means being constructed so that said wheels extend generally upwardly from said chassis means adjacent to the sides of said body,
   those of said joist means adjacent to said undercarriage means terminating within the sides of said body so as to provide spaces located generally above said undercarriage means for said wheels at the sides of said body, and
   tank means for holding fluids associated with the use of said trailer located between those joist means generally above said undercarriage means.

2. A trailer as claimed in claim 1 wherein:
said tank means includes a tank for holding consumable water.

3. A trailer as claimed in claim 1 wherein:
said tank means includes a tank for holding liquid waste.

4. A trailer as claimed in claim 1 wherein:
said tank means includes a tank of holding consumable water and another tank for holding liquid waste which is normally filled as water from said first mentioned tank is used.

5. A trailer as claimed in claim 1 wherein:
functional items associated with the use of said trailer are located within said spaces both toward the front and toward the rear of said trailer from said undercarriage means so as to achieve a weight balance on each side of said undercarriage means such that the weight at said means for towing is suitable to the use of said trailer behind a towing vehicle.

6. A trailer as claimed in claim 1 wherein:
means for filling and emptying said tanks are located within said spaces.

7. a trailer as claimed in claim 1 wherein:
at least some of said spaces other than those spaces located generally above said undercarriage means are useful for storage purposes.

8. A trailer as claimed in claim 1 wherein:
said tank means includes a tank for holding consumable water and another tank for holding liquid waste which is normally filled as water from said first mentioned tank is used,
functional items associated with the use of said trailer are located within said spaces both toward the front and toward the read of said trailer from said undercarriage means so as to achieve a weight balance on each side of said undercarriage means such that the weight at said means for towing is suitable to the use of said trailer behind a towing vehicle,
means for filling and emptying said tanks are located within said spaces and at least some of said spaces other thoan those spaces located generally above said undercarriage means are useful for storage purposes.

* * * * *